(12) United States Patent
Rawdon

(10) Patent No.: US 12,151,806 B2
(45) Date of Patent: *Nov. 26, 2024

(54) SYSTEMS AND METHODS FOR CONTROLLING LANDING GEAR OF AN AIRCRAFT

(71) Applicant: JETZERO, INC., Long Beach, CA (US)

(72) Inventor: Blaine Knight Rawdon, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,289

(22) Filed: Jun. 15, 2023

(65) Prior Publication Data
US 2024/0002041 A1 Jan. 4, 2024

Related U.S. Application Data

(63) Continuation of application No. 17/502,505, filed on Oct. 15, 2021, now Pat. No. 11,713,110.

(51) Int. Cl.
*B64C 25/26* (2006.01)
*B64C 25/00* (2006.01)
(Continued)

(52) U.S. Cl.
CPC ............ *B64C 25/26* (2013.01); *B64C 25/001* (2013.01); *F15B 1/02* (2013.01); *F15B 15/18* (2013.01);
(Continued)

(58) Field of Classification Search
CPC ......... B64C 25/26; B64C 25/58; B64C 25/60; B64C 25/001; B64C 2025/008;
(Continued)

(56) References Cited

U.S. PATENT DOCUMENTS 2,323,640 A   7/1943 Armstrong
2,630,989 A * 3/1953 Sikorsky ................. B64C 25/62
                                                244/102 R (Continued)

FOREIGN PATENT DOCUMENTS

CA      2633508 A1 *  5/2008  ........... B64C 25/001
DE   202010016892       8/2011

(Continued)

OTHER PUBLICATIONS

"Aircraft Landing Gear design & Development", Infosys (Year: 2018).*

*Primary Examiner* — Assres H Woldemaryam
(74) *Attorney, Agent, or Firm* — Caldwell Intellectual Property Law

(57) ABSTRACT

Aspects relate to systems and methods for controlling landing gear of an aircraft. An exemplary system includes a nose gear located at a nose of the aircraft, where the nose gear includes a nose piston configured to allow for displacement of a nose wheel relative the aircraft, a main gear located aft of the nose gear, where the main gear includes a main piston configured to allow for displacement of a main wheel relative the aircraft, a hydraulic circuit in fluidic communication with each of the nose piston and the main piston, and a compliant element in fluidic communication with the hydraulic circuit and configured to provide a compliant response at one or both of the nose piston and the main piston.

18 Claims, 12 Drawing Sheets

(51) Int. Cl.
   *F15B 1/02*    (2006.01)
   *F15B 15/18*   (2006.01)
   *B64C 39/10*   (2006.01)

(52) U.S. Cl.
   CPC .. *B64C 2025/008* (2013.01); *B64C 2039/105* (2013.01); *F15B 2211/30* (2013.01)

(58) Field of Classification Search
   CPC ..... B64C 2039/105; B64C 25/22; F15B 1/02; F15B 15/18; F15B 2211/30; F15B 1/08; F15B 2201/205
   See application file for complete search history.

(56) References Cited

U.S. PATENT DOCUMENTS

| | | | | |
|---|---|---|---|---|
| 4,911,381 A * | 3/1990 | Cannon | ............ | B64D 11/0696 244/122 R |
| 5,548,517 A * | 8/1996 | Nance | ............ | G01M 1/125 702/175 |
| 7,249,736 B2 | 7/2007 | Clark | | |
| 7,427,049 B2 * | 9/2008 | Kennedy | ............ | B64D 11/0696 244/118.6 |
| 7,789,343 B2 | 9/2010 | Sarh et al. | | |
| 8,070,094 B2 * | 12/2011 | Collins | ............ | B64C 25/12 244/102 SL |
| 8,886,402 B1 * | 11/2014 | Lou | ............ | F16F 9/063 701/16 |
| 9,845,152 B2 | 12/2017 | Stan | | |
| 10,150,558 B2 * | 12/2018 | Page | ............ | B64C 39/10 |
| 10,287,011 B2 | 5/2019 | Wolff et al. | | |
| 10,364,018 B2 | 7/2019 | Wildschek et al. | | |
| 10,464,663 B2 | 11/2019 | Luce | | |
| 10,857,906 B2 * | 12/2020 | Jameson | ............ | B60N 2/682 |
| 10,933,975 B2 | 3/2021 | Ratti | | |
| 11,014,654 B2 | 5/2021 | Thompson | | |
| 11,186,375 B2 * | 11/2021 | Wolgast | ............ | B64D 11/0696 |
| 2006/0220918 A1 | 10/2006 | Stockwell et al. | | |
| 2009/0120748 A1 * | 5/2009 | Love | ............ | B60N 2/42745 188/314 |
| 2018/0001999 A1 * | 1/2018 | Page | ............ | B64C 25/14 |
| 2018/0194453 A1 | 7/2018 | Randall et al. | | |
| 2018/0346103 A1 * | 12/2018 | Thompson | ............ | B64C 25/10 |
| 2020/0023947 A1 | 1/2020 | Page | | |
| 2020/0207463 A1 * | 7/2020 | Schuster | ............ | B64C 25/40 |
| 2020/0207464 A1 | 7/2020 | Whitlock et al. | | |
| 2020/0333805 A1 * | 10/2020 | English | ............ | B64C 13/04 |

FOREIGN PATENT DOCUMENTS

| | | | | |
|---|---|---|---|---|
| DE | 202010016892 U1 | 10/2011 | | |
| EP | 3281867 A1 * | 2/2018 | ............ | B64C 25/22 |
| GB | 2587416 A * | 3/2021 | ............ | B64C 25/28 |
| GB | 2588596 A * | 5/2021 | ............ | B64C 25/42 |
| GB | 2588597 A * | 5/2021 | ............ | B60T 8/1703 |
| WO | WO-2015158894 A1 * | 10/2015 | ............ | B64C 25/001 |
| WO | 2020234591 | 11/2020 | | |
| WO | 2021123540 | 6/2021 | | |

* cited by examiner

SYSTEMS AND METHODS FOR CONTROLLING LANDING GEAR OF AN AIRCRAFT

CROSS-REFERENCE TO RELATED APPLICATIONS

This application is a continuation of Nonprovisional application Ser. No. 17/502,505 filed on Oct. 15, 2021, and entitled "SYSTEMS AND METHODS FOR CONTROLLING LANDING GEAR OF AN AIRCRAFT," the entirety of which is incorporated BY REFERENCE

FIELD OF THE INVENTION

The present invention generally relates to the field of aircraft. In particular, the present invention is directed to systems and methods for controlling landing gear of an aircraft.

BACKGROUND

Aircraft are generally designed with strict constraints on weight and volume. These constraints apply to all flight components including landing gear. Landing gear associated with exciting new jetliner aircraft types include additional design requirements that typically require additional components that take up space and weight.

SUMMARY OF THE DISCLOSURE

In an aspect, a system for controlling landing gear on an aircraft is provided. The system includes at least a nose gear located at a nose of the aircraft, wherein the at least a nose gear comprises a nose piston configured to allow for displacement of a nose wheel relative to the aircraft. The system includes at least a main gear located aft of the nose gear, wherein the main gear comprises a main piston configured to allow for displacement of a main wheel relative to the aircraft. The system includes a hydraulic circuit in fluidic communication with each of the nose piston and the main piston. The system includes a compliant element in fluidic communication with the hydraulic circuit and configured to provide a compliant response at both of the nose piston and the main piston. The system includes a nose gear actuator configured to extend and retract the at least a nose gear. The system includes a main gear actuator configured to extend and retract the at least a main gear. The system includes a controller, wherein the controller is configured to control a compliant parameter associated with the compliant response of the compliant element. The system includes at least a gear sensor communicative with the controller and configured to detect folding and unfolding of the at least a nose gear and the at least a main gear.

In another aspect, a method of controlling landing gear on an aircraft is provided. The method includes displacing, by a nose piston of at least a nose gear located at a nose of an aircraft, a nose wheel relative to the aircraft. The method includes displacing, by a main piston of at least a main gear located aft of the nose gear, a main wheel relative to the aircraft. The method includes providing, by a compliant element in fluidic communication with a hydraulic circuit in fluidic communication with each of the nose piston and the main piston, a compliant response at both of the nose piston and the main piston. The method includes extending and retracting, by a nose gear actuator, the at least a nose gear. The method includes extending and retracting, by a main gear actuator, the at least a main gear. The method includes controlling, by a controller, a compliant parameter associated with the compliant response of the compliant element. The method includes detecting, by at least a gear sensor communicative with the controller, folding and unfolding of the at least a nose gear and the at least a main gear.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for controlling landing gear of an aircraft. In an embodiment, aircraft may include a blended wing body aircraft and landing gear may be used to adjust angle of attack, for example during take-off.

Aspects of the present disclosure can be used to provide a spring response as well as adjustable displacement using only one landing gear component, thereby saving space and weight. Aspects of the present disclosure can also be used to fold or compress landing gear into a minimal size for stowage during flight. This is so, at least in part, because adjusting angle of attack of an aircraft requires extendable landing gear, which cannot be stowed in its extended configuration.

Aspects of the present disclosure allow for use of blended wing body aircraft technology for commercial air travel, by allowing for location of landing gear away from passenger compartment. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 6. Furthermore, there is no intention to be bound by any expressed or implied theory presented in this disclosure.

Figure 1:
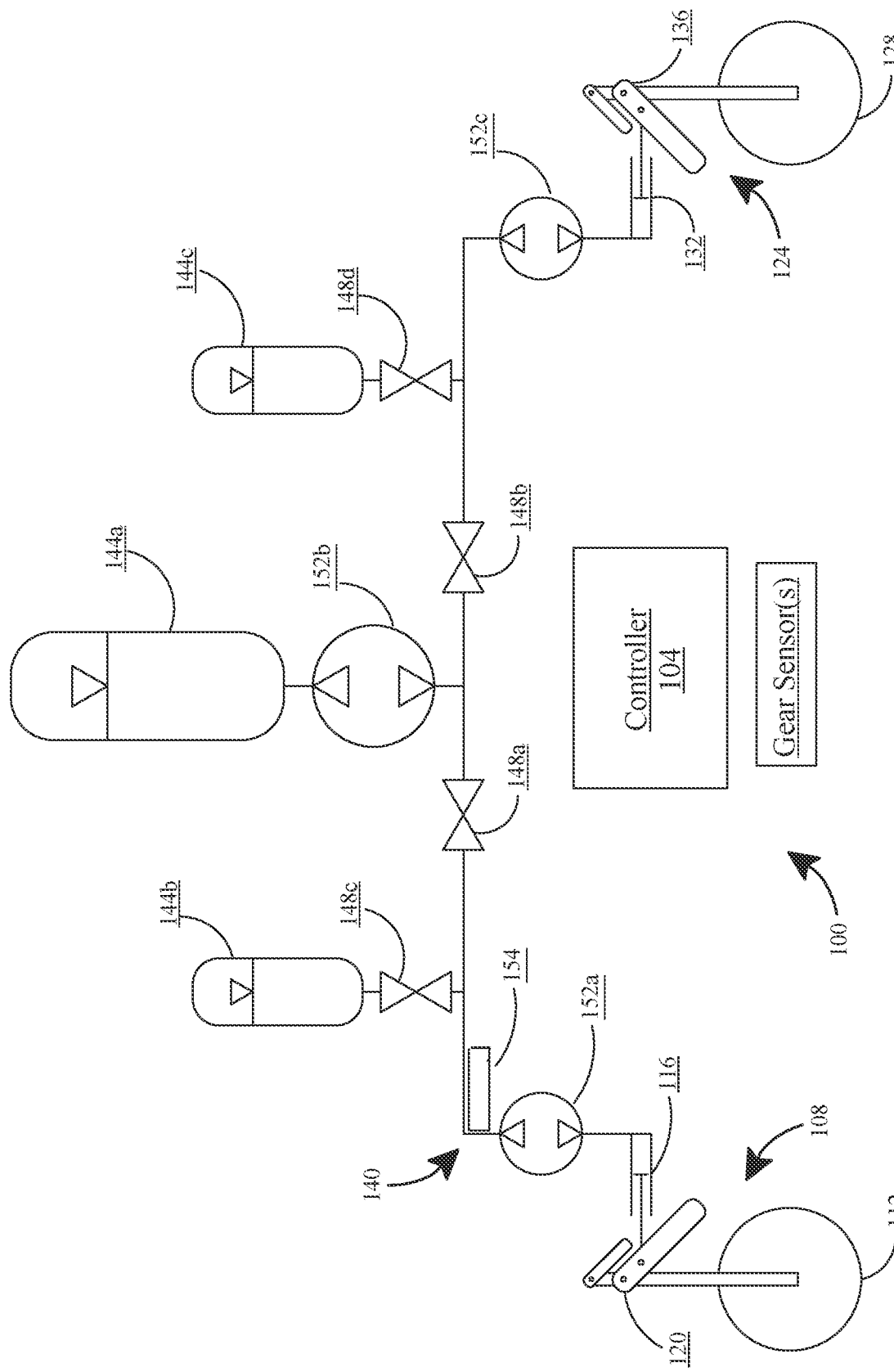
FIG. 1 is a block diagram illustrating an exemplary system for controlling landing gear of an aircraft.

Referring now to FIG. 1, an exemplary embodiment of a system 100 for controlling landing gear of an aircraft is illustrated. System includes a controller 104. Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 104 may include but is not limited to, for example, a computing device or cluster of computing devices in a first location and a second computing device or cluster of computing devices in a second location. Controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. Controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a nose gear 108. As used in this disclosure, "nose gear" is a landing gear assembly located substantially at a nose portion of aircraft. Nose gear 108 may include a nose wheel 112. As used in this disclosure, "nose wheel" is a wheel component within a nose gear landing gear assembly that is configured to make contact with and roll on ground. Wheel may include a pneumatic tire. Nose gear 108 may include a nose piston 116. As used in this disclosure, "nose piston" is a piston located in nose gear landing gear assembly. Nose piston 116 may include a hydraulic cylinder. Nose piston may include a first end of the nose piston attached, directly or indirectly, to nose wheel 112. Nose piston 116 may include a second end of the nose piston attached, directly or indirectly, to aircraft. Nose piston 116 may be configured to displace nose wheel 112 relative aircraft. In some cases, nose gear 108 may include nose linkage 120. Nose linkage 120 may transform movement of nose piston 116 to movement of nose wheel 112 relative aircraft. Nose linkage 120 may include any linkage described in this disclosure including with reference to FIGS. 2A-5B below.

With continued reference to FIG. 1, system 100 may include a main gear 124. As used in this disclosure, "main gear" is a landing gear assembly located substantially aft of nose gear 108 on an aircraft. Main gear 124 may include a main wheel 128. As used in this disclosure, "nose wheel" is a wheel component within a main gear landing gear assembly that is configured to make contact with and roll on ground. Wheel may include a pneumatic tire. Main gear 124 may include a main piston 132. As used in this disclosure, "main piston" is a piston located in main gear landing gear assembly. Main piston 132 may include a hydraulic cylinder. Main piston may include a first end of the main piston attached, directly or indirectly, to main wheel 128. Main piston 132 may include a second end of the main piston attached, directly or indirectly, to aircraft. Main piston 132 may be configured to displace main wheel 128 relative aircraft. In some cases, main gear 124 may include main linkage 136. Main linkage 136 may transform movement of main piston 132 to movement of main wheel 1238 relative aircraft. Main linkage 136 may include any linkage described in this disclosure including with reference to FIGS. 2A-5B below.

With continued reference to FIG. 1, system 100 may include a hydraulic circuit 140. As used in this disclosure, "hydraulic circuit" is an assembly of components configured to contain fluidic pressure (e.g., hydraulic pressure, pneumatic pressure, and the like) and permit fluidic flow (e.g., hydraulic flow, pneumatic flow, and the like). Fluid circuit may be in fluidic communication with nose piston 116 and/or main piston 132. "Fluidic communication," as used in this disclosure is a relationship which allows for movement of fluid between two relata, for instance two hydraulic components.

With continued reference to FIG. 1, hydraulic circuit 140 may include a compliant element 144a-c. As used in this disclosure, a "compliant element" is any component that produces an effort (e.g., force, potential, and the like) proportional to an integrated a flow (e.g., displacement, charge, and the like) or a flow proportional to a change in effort. A compliant element 144a-c may be understood, in some cases, according to Hooke's law. For instance $$F_{compliance} = k * d$$

where, $F_{compliance}$ is force, k is spring rate (i.e., stiffness), and d is displacement of spring. In some cases, a compliant element 144a-c may be considered as a potential energy storage device. In some cases, considered compliant element 144a-c as a spring may aid in understanding its function. Exemplary non-limiting compliant elements 144a-c include hydraulic accumulators, raised weight accumulators, air-filled accumulators, compressed gas closed accumulators, spring-loaded accumulators, metal bellows type accumulators, expansion tanks, diaphragm accumulators, bladder accumulators, piston accumulators, and the like. Controller 104 may control a parameter associated with compliant element 144a-c. Exemplary non-limiting parameters associated with compliant element include spring rate, accumulator pressure, and the like. In some cases, controller 104 may control a parameter associated with compliant response (e.g., spring rate) on a pneumatic-hydraulic accumulator 144a-c by changing gas pressure within accumulator. For example, controller 104 may control an air pump and/or value to increase or decrease air within accumulator to adjust compliant response. In some cases, compliant element 144a-c may include a device (i.e., transformer) that transforms a domain of energy from hydraulic to another domain (e.g., pneumatic, mechanical, electrical, thermal, and the like). For instance in some cases, compliant element 144a-c may include a piston accumulator loaded on one-end of the piston with hydraulic pressure and loaded on the other end with a mechanical force (e.g., spring force). In this manner, compliant element 144a-c may provide a compliant response from a non-hydraulic element by way of hydraulic circuit 140 to nose gear 108 or main gear 124. In some additional embodiments, hydraulic circuit 140 may be replaced by another power transfer circuit, for instance without limitation a mechanical circuit (e.g., cables and linkages), an electrical circuit (e.g., electrical cables and electro-magnetic transformer [i.e., motors]), pneumatic circuit and the like. In some embodiments, compliant element may include a nose compliant element 144b which is in fluidic communication with nose piston 116. In some cases, nose compliant element 144b may be configured to provide a compliant response substantially at nose gear 108. A valve 148a-b may isolate nose piston 116 and nose compliant element 144b from main piston 132. Another valve 148c may isolate nose compliant element 144b from hydraulic circuit 140. Alternatively or additionally, another valve 148c may variably control a hydraulic resistance and a resistant response that may act in concert with nose compliant element 144b. In some embodiments, compliant element may include a main compliant element 144c in fluidic communication with main piston 132. In some cases, main compliant element 144c may be configured to provide a compliant response substantially at main gear 124. A valve 148a-b may isolate main piston 132 and nose compliant element 144c from nose piston 116. Another valve 148d may isolate main compliant element 144c from hydraulic circuit 140. Alternatively or additionally, another valve 148d may variably control a hydraulic resistance and a resistant response that may act in concert with main compliant element 144c. In some cases, controller 104 may calculate an appropriate combination of compliant parameters and resistant parameters to achieve a desired dampening for landing gear suspension. In some cases, calculating compliant parameters and resistant parameters may include one or more of a look up table (LUT), determining a damping ratio, modeling performance of system 100, and the like. In some cases, calculation of one or more of compliant parameters and resistant parameters may be supported by measurement, for example, of displacement of landing gear components (e.g., oscillations).

With continued reference to FIG. 1, compliant element 144a-c may be configured to produce a compliant response at one or both of nose gear 108 and main gear 124. As used in this disclosure, a "compliant response" is a response that produces an effort (e.g., force, potential, and the like) proportional to an integrated flow (e.g., displacement, charge, and the like) or a flow in proportional to a change in effort. In some cases, compliant response may be communicated by way of hydraulic circuit from compliant element 144a-c to one or both of nose piston 116 and main piston 132. In some cases, compliant response may allow one or both of nose piston 116 and main piston 132 to behave like a spring. Compliant response may absorb energy associated with displacements of nose wheel 112 and/or main wheel 128, for instance displacements associated with landing, uneven ground surfaces, and the like. In some cases, compliant response may be complemented with a resistant response. As used in this disclosure, a "resistant response" is a response that produces an effort (e.g., force, potential, and the like) proportional to a flow (e.g., displacement, charge, and the like) or dissipates energy at a rate proportional to a flow. In some cases, a resistant element may be used in conjunction with a compliant element 144a-c. Resistant element may include any element that produces a hydraulic resistance, such as without limitation a valve, a nozzle, turbulators, and the like. As used in this disclosure, a "resistant element" is any component that produces an effort (e.g., force, potential, and the like) proportional to a flow (e.g., displacement, charge, and the like) or dissipates energy at a rate proportional to a flow. In some cases, resistant response and compliant response may be matched at one or more of nose gear 108 and main gear 124 to yield an appropriately damped suspension (e.g., critically damped). In some cases, a resistant element may have a variable resistant response. For example, a valve 148a-d may have a resistant response that is substantially a function of cross-sectional area of a port within valve and valve may have a variable port area (e.g., ball, aperture, diaphragm, and the like).

With continued reference to FIG. 1, hydraulic circuit 140 may include a displacement element. As used in this disclosure, a "displacement element" is a component that is configured to produce a displacement of another component. Displacement element may be configured to displace one or both of nose gear 108 and main gear 124, for example by way of one or more of nose piston 116 and main piston 132. In some cases, displacement element may include at least a valve 148*a-d*. For example, in some embodiments, displacement element may include a linking valve 148*a-b* linking nose gear 108 and main gear 124. As used in this disclosure, a "linking valve" is a component that controls fluidic communication between two or more components on a hydraulic circuit. In some cases, cases linking valve 148*a-b* may be used to control fluidic communication between nose piston 116 and main piston 132. In some cases, depending upon a parameter of linking valve 148*a-b* nose piston 116 and main piston 132 may be connected by way of hydraulic circuit 140 or they may be isolated from one another. In some cases, linking valve 148*a-b* may be configured to vary a degree of fluidic communication between nose piston 116 and main piston 132, for example by varying flow, resistance, or the like between the two components. Linking valve 148*a-b* may include any valve described in this disclosure. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic circuit 140, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by controller 104. Controller 104 by in communication with valve, for example by way of one or more of electrical communication, hydraulic communication, pneumatic communication, mechanical communication, and the like. In some cases, controller 104 may be in communication with one or more components (e.g., valve, pump, sensors, and the like) by way of one or more networks, including for example wireless networks and controller area networks (CANs).

Still referring to FIG. 1, in some embodiments, displacement element may include a hydraulic pump 152*a-c*. Hydraulic pump 152*a-c* may include a substantially constant pressure pump (e.g., centrifugal pump) or a substantially constant flow pump (e.g., positive displacement pump, gear pump, and the like). Hydraulic pump 152*a-c* can be hydrostatic or hydrodynamic. As used in this disclosure, a "hydraulic pump" is a mechanical source of power that converts mechanical power into hydraulic energy. A hydraulic pump may generate flow with enough power to overcome pressure induced by a load at a pump outlet. A hydraulic pump may generate a vacuum at a pump inlet, thereby forcing liquid from a hydraulic reservoir 154 into the pump inlet to the hydraulic pump and by mechanical action delivers this liquid to a pump outlet, thereby forcing it into the hydraulic system. Hydrostatic pumps 152*a-c* are positive displacement pumps. Hydrodynamic pumps 152*a-c* can be fixed displacement pumps, in which displacement may not be adjusted, or variable displacement pumps, in which the displacement may be adjusted. Exemplary non-limiting hydraulic pumps 152*a-c* include gear pumps, rotary vane pumps, screw pumps, bent axis pumps, inline axial piston pumps, radial piston pumps, and the like. Hydraulic pump 152*a-c* may be powered by any rotational mechanical work source, for example without limitation and electric motor or a power take off from a combustion engine. System 100 may include at least a reservoir 154 in which to store hydraulic fluid, thereby allowing for an amount of hydraulic fluid within hydraulic circuit 140 to be controlled. In some cases, reservoir 154 may be unpressurized, and, therefore, the reservoir 154 may allow for displacement to occur without affecting compliant response. Alternatively, in some cases, displacement may occur by pumping hydraulic fluid into an accumulator (compliant element), which may increase a compliant response (e.g., spring rate).

With continued reference to FIG. 1, controller 104 may be in communication with one or more components of hydraulic circuit 140. Controller 104 may be configured to control a parameter associated with displacement element. For instance, in some cases, controller 104 may be configured to displace one or more of nose gear 108 and main gear 124 using a displacement element. Controller 104 may displace nose gear 108 and/or main gear 124 through control of one or more of a linking valve 148*a-d* and a hydraulic pump 152*a-c*. For example, in some cases, controller 104 may operate a hydraulic pump 152*a-c* in order to displace landing gear. Controller 104 may operate a hydraulic pump by engaging mechanical work source powering pump, for instance electric motor or power take off. In some cases, a hydraulic pump may be operated in part by valving hydraulic fluid to pump, for example by way of valves and manifold in hydraulic circuit. Alternatively or additionally, in some cases, controller 104 may operate one or more valves (e.g., linking valve) to displace landing gear. Valve operating may include energizing/de-energizing solenoids, mechanically opening valves for instance with motors, and the like. In some embodiments, controller 104 may be configured to control a parameter associated with displacement element to vary an angle of attack of the aircraft. As used in this disclosure, "angle of attack" of a grounded aircraft is an angle between longitudinal axis of aircraft and horizontal. Additional disclosure related to adjusting angle of attack of aircraft may be found in U.S. application Ser. Nos. 16/181, 687 and 15/198,611 both of which are entitled "TILTING LANDING GEAR SYSTEMS AND METHODS" and both of which are incorporated herein by reference.

Still referring to FIG. 1, in some embodiments, controller 104 may be configured to control a parameter associated with compliant element 144*a-c*. For example, in some cases, controller 104 may control a compliant response at one or both of nose gear 108 and main gear 124 by controlling a parameter of compliant element 144*a-c*. An exemplary parameter associated with a compliant element 144*a-c* may include pneumatic pressure within a pneumatic-hydraulic accumulator 144*a-c*. In some embodiments, controller 104 may control an air source, such as an air pump or valve, to control air pressure within a pneumatic hydraulic accumulator 144*a-c* and thereby affect compliant response.

Still referring to FIG. 1, in some embodiments, system 100 may additionally include a mechanism to fold and/or unfold (i.e., hinge and/or unhinge) landing gear. When landing gear is lowered (i.e., extended) it may be positioned in order to make contact with ground, for instance for take-off, taxiing, parking, and/or landing. When landing gear is raised (i.e., retracted) is may be positioned to reduce drag while aircraft is in flight. In some cases, raised landing gear may be positioned within a housing inside an outer mold line (OML) of aircraft, such that landing gear does not interacting with passing air and does not affect aircraft drag. Aircraft design is often constrained for size and in some cases, landing gear housing may be space constrained. In order to address this, landing gear may be configured to fold into a smaller envelope when not in use. For example in some cases, nose gear 108 may additionally include a nose gear actuator. As used in this disclosure, "nose gear actuator" is a system that is configured to fold and/or unfold nose gear 108. In some cases, main gear 124 may additionally include a main gear actuator. As used in this disclosure, "main gear actuator" is a system that is configured to fold and/or unfold main gear 124. In some cases, a gear actuator may include an actuator applying mechanical work to a landing gear assembly, for example by way of a crank, a cam, a lead screw, and the like. Exemplary actuators include without limitation hydraulic actuators, pneumatic actuators, mechanical actuators, electric actuators, and the like. A landing gear actuator may include any actuator described in this disclosure, for example with reference to FIGS. 2A-6 below. In some cases, controller 104 may be configured to control one or more of nose gear actuator and main gear actuator. For example, in some cases, controller 104 may raise and lower nose gear 108 and main gear 124. Additionally, gear sensors may be used in association with gear actuators. Gear sensors may be used to detect a status of extension/retraction and/or folding/unfolding of nose gear 108 and/or main gear 124. For example, in some cases gear sensors may detect when landing gear is completely extended/retracted and/or folded/unfolded, for instance by using one or more proximity sensors. Exemplary proximity sensors include without limitation, switches, ultrasonic proximity sensors, time of flight (ToF) sensors, linear encoders, rotational encoders, and the like. Gear sensors may be in communication with controller 104. Controller 104 may control one or both of nose gear actuator and main gear actuator using feedback from gear sensors.

Still referring to FIG. 1, in some embodiments, aircraft may include a blended wing body (BWB) aircraft. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at a leading edge of the wings. For example, a BWB 604 aircraft may have distinct wing and body structures, which are smoothly blended together with no clear dividing line or boundary feature between wing and fuselage. In some cases, a BWB 604 may be understood as a hybrid shape that resembles a flying wing, but also incorporates features from conventional aircraft. In some cases, this combination may offer several advantages over conventional tube-and-wing airframes. In some cases, a BWB airframe 604 may help to increase fuel economy and create larger payload (cargo or passenger) volumes within the BWB. BWB 604 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume.

Figure 2A:
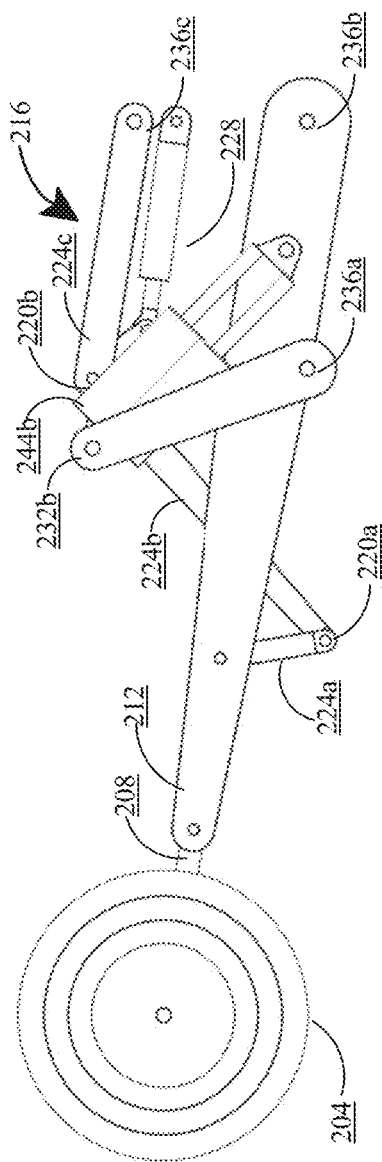
FIG. 2A is a side view of an exemplary retracted and folded landing gear.
Figure 3A:
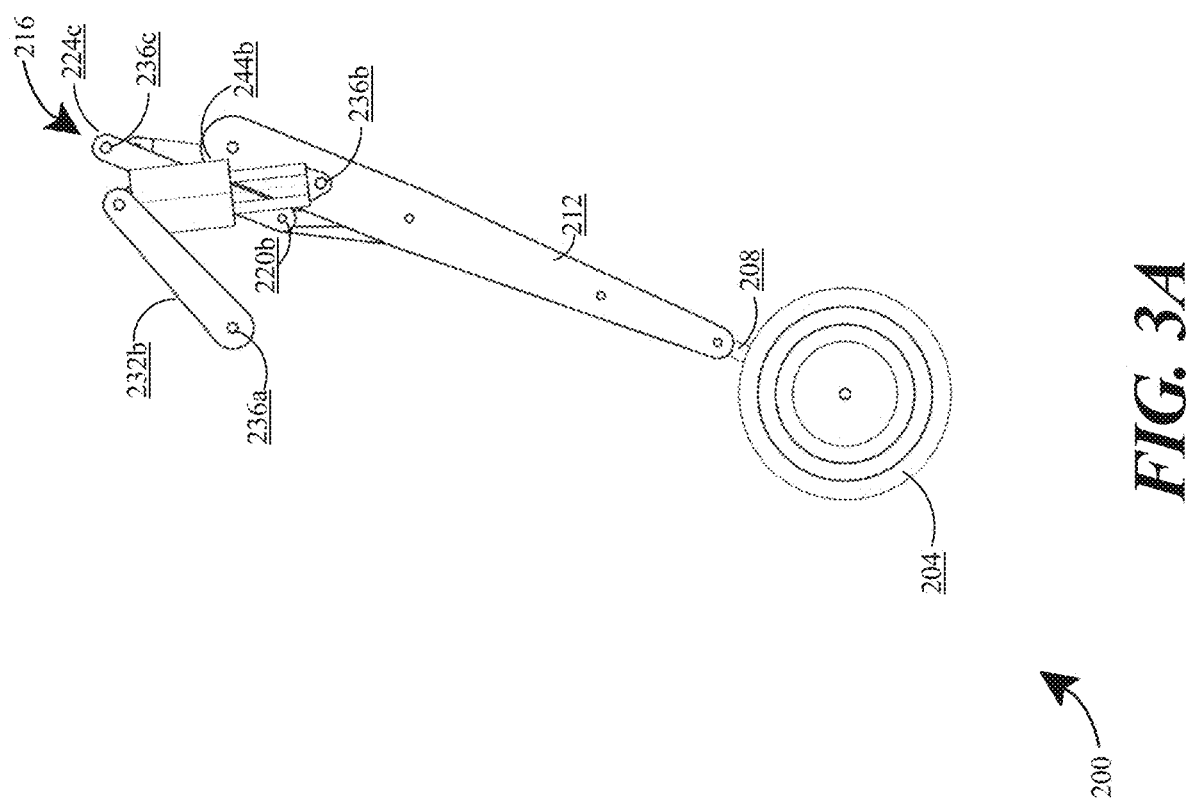
FIG. 3A is a side view of an exemplary extended and folded landing gear.
Figure 3B:
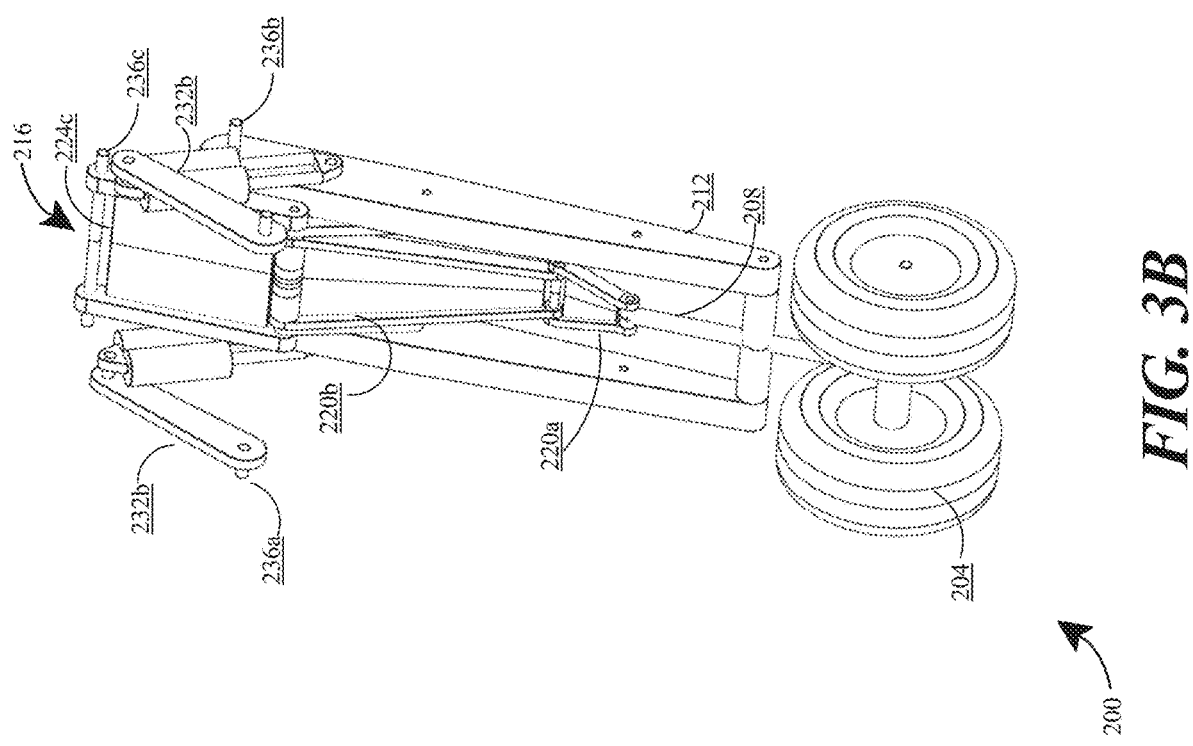
FIG. 3B is an isometric view of an exemplary extended and folded landing gear.
Figure 4A:
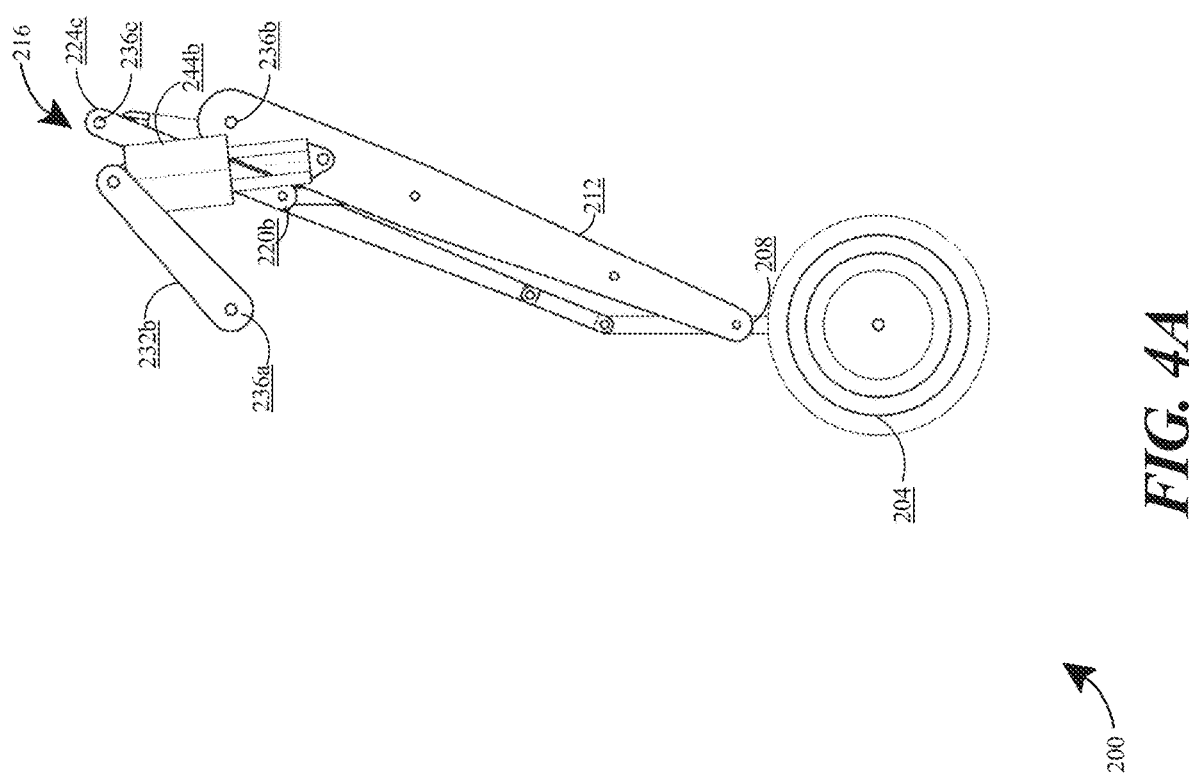
FIG. 4A is a side view of an exemplary extended landing gear.
Figure 4B:
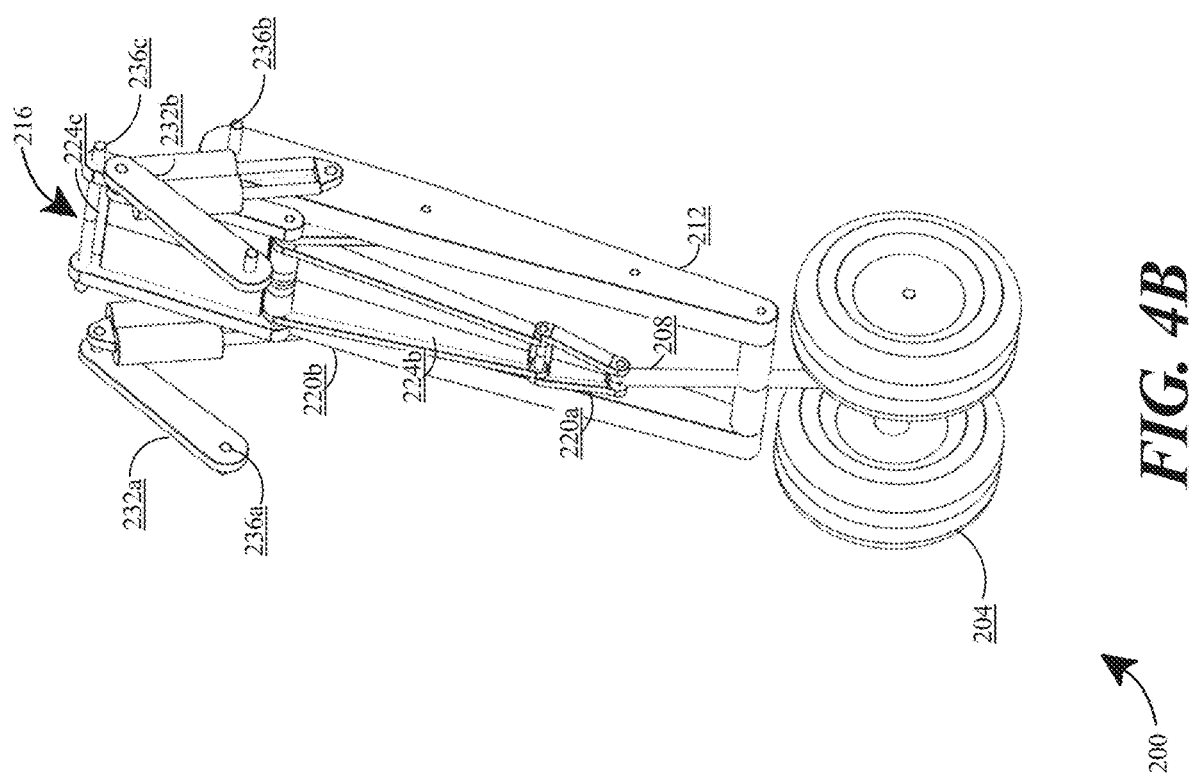
FIG. 4B is an isometric view of an exemplary extended landing gear.
Figure 5A:
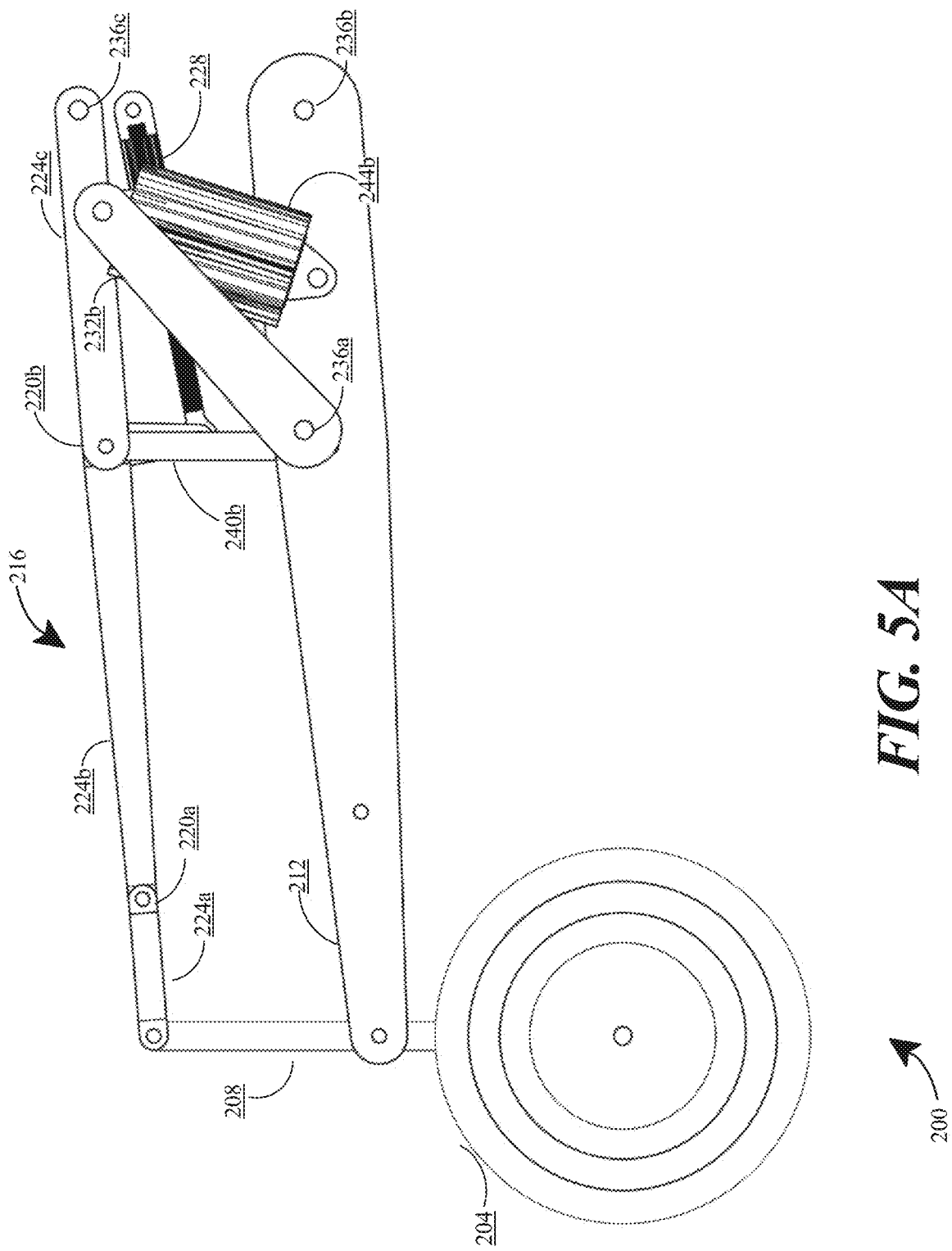
FIG. 5A is a side view of an exemplary compressed landing gear.
Figure 5B:
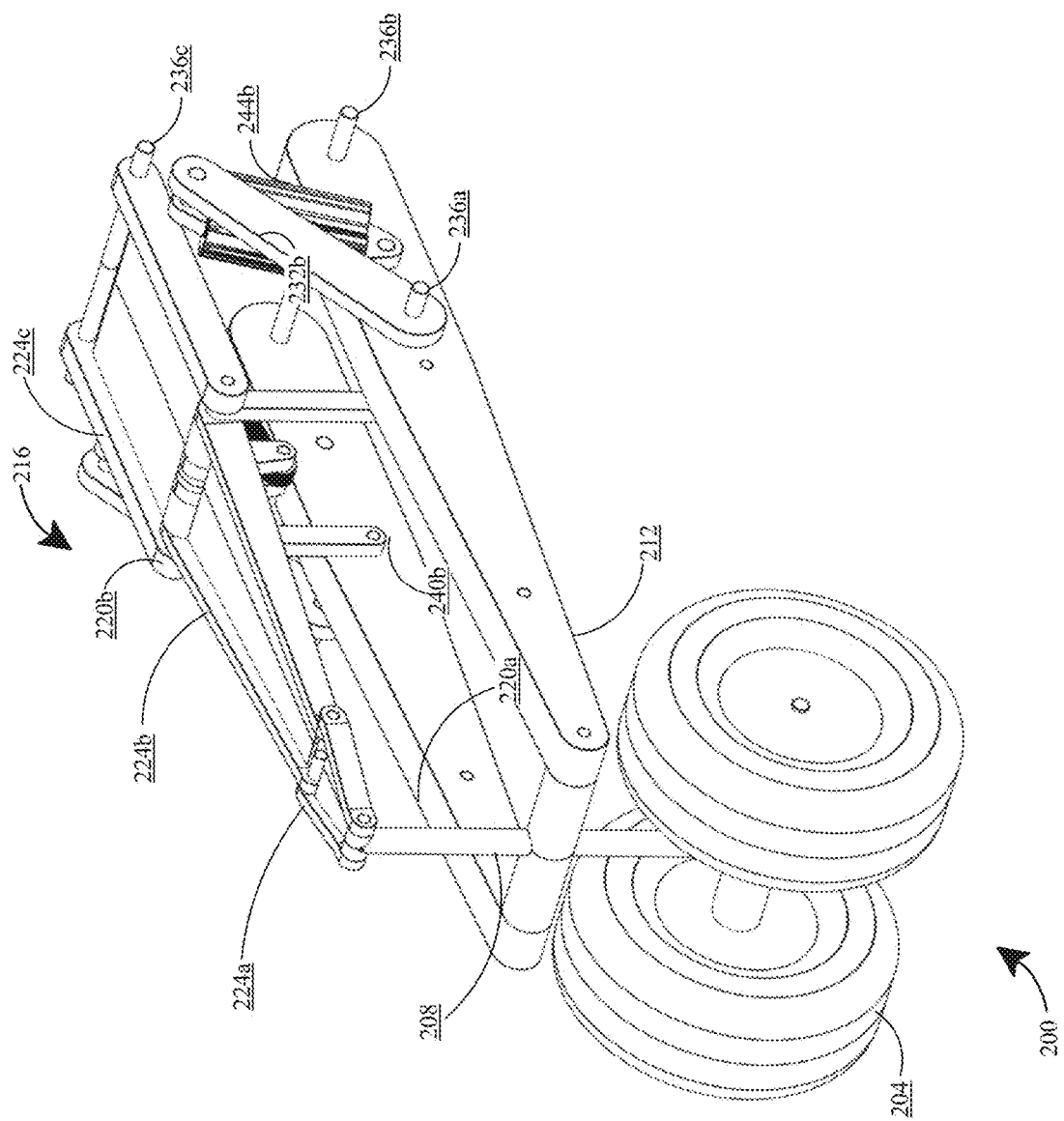
FIG. 5B is an isometric view of an exemplary compressed landing gear.

Referring now to FIGS. 2A-5B, an exemplary landing gear is illustrated in numerous views and positions. FIGS. 2A-B illustrate landing gear in a raised and folded configuration, for instance as landing gear would be configured when housed during flight. FIGS. 3A-B illustrate landing gear in a lowered and folded configuration, for instance as landing gear may be as it is in a process of extension for use during landing. FIGS. 4A-B illustrate landing gear in a lowered and unfolded position fully extended. FIGS. 5A-B illustrate landing gear in a lowered and unfolded position fully compressed. Landing gear 200 may include at least a wheel 204. Wheel may be connected to landing gear by way of a kingpin 208. In some cases, kingpin 208 may be used as a pivot within a steering mechanism. In some cases, one or both of nose gear and main gear may include steering mechanisms configured to allow for steering of wheel(s) while aircraft is on ground. Kingpin 208 may be pivotably attached to a lower A arm 212 and an upper A arm 216 at two locations along the length of the kingpin 208. In some cases, lower A arm 212 may be substantially rigid. Conversely, in some cases, upper A arm 216 may hinge at one or more upper A arm hinges 220*a*-*b*. In some cases, upper A arm 216 may include multiple components 224*a*-*c*, for example a distal segment 224*a* farthest from aircraft, a middle segment 224*b*, and a proximal segment 224*c* that may be mounted to aircraft.

Figure 2B:
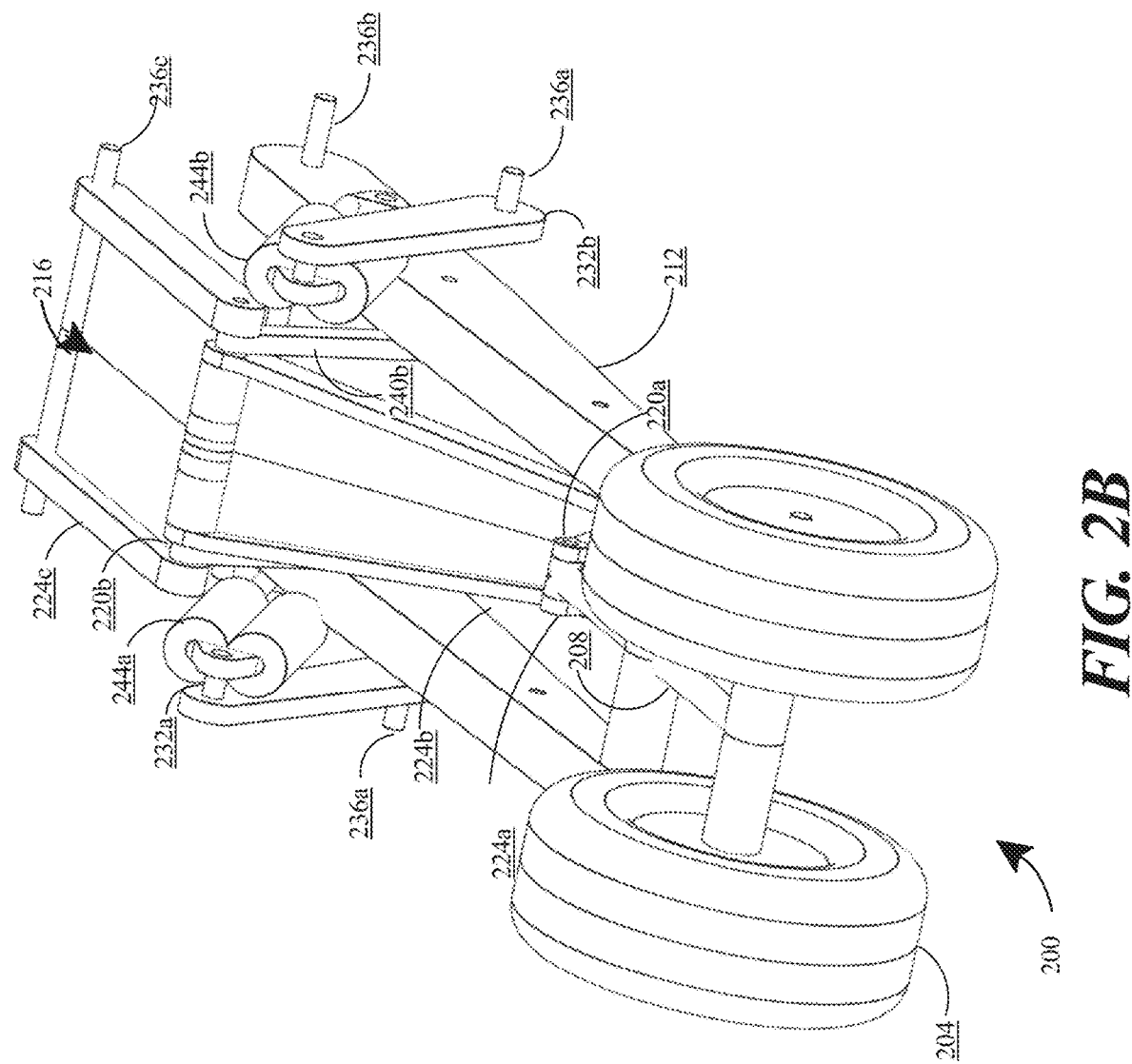
FIG. 2B is an isometric view of an exemplary retracted and folded landing gear.

Referring momentarily to FIGS. 2A-B specifically, upper A arm 216 may fold allowing for compaction of landing gear 200, when raised. An upper A arm actuator 228 may be used to hinge and/or unhinge upper A arm 216 and thereby fold and/or unfold landing gear 200. Upper A arm actuator may include any actuator described in this disclosure, including without limitation hydraulic actuators, pneumatic actuators, and electric actuators. In some cases, upper A arm actuator 228 acts on middle segment 224*b*, straightening middle segment 224*b* inline with proximal segment 224*c* when landing gear is unfolded, as is shown in FIGS. 3A-5B. In some cases, distal segment 224*a* is also straightened with middle segment 224*b*. In some cases, upper A arm actuator 228 acts upon one or more of distal segment 224*a* and middle segment 224*b* by way of a crank. In some cases, a fixed stop may prevent one or both of distal segment 224*a* and middle segment 224*b* from being hinged past straight (i.e., in-plane) with proximal segment 224*c*.

With continued reference to FIGS. 2A-5B generally, in some cases, proximal segment 224*c*, lower A arm 212, and at least a piston link 232*a*-*b*, may be pivotably mounted to aircraft, for example substantially along three pivot axes 236*a*-*c*. For instance piston link 232*a*-*b* may be pivotably mounted to aircraft at one end of piston link, at a link-aircraft pivot axis 236*a*. Lower A arm 212 may be pivotably mounted to aircraft at a lower A arm-aircraft pivot axis 236*b*. Upper A arm 216 may be pivotably mounted to aircraft at an upper A arm-aircraft pivot axis 236*c*. In some cases, proximal segment 224*c* of upper A arm 216 may be kept substantially parallel with lower A arm 212, for instance by selection of locations of lower A arm-aircraft pivot axis 236*b* and upper A arm-aircraft pivot axis 236*c* and/or at least an A arm link 240*a*-*b*. An arm link 240*a*-*b* may pivotably attach to lower A arm 212 at a first end and upper A arm 216 at proximal A arm hinge 220*b*. Piston link 232*a*-*b* may be connected to at least a piston 244*a*-*b*. Piston 244*a*-*b* may include any piston described in this disclosure, including with reference to FIG. 1 above. Piston 244*a*-*b* may be pivotably attached to piston link at a first end and pivotably attached to lower A arm 212 at a second end.

Referring specifically to FIGS. 3A-B, landing gear 200 is illustrated in a lowered and folded configuration. In this configuration, the landing gear 200 may be moved out of a housing of aircraft, but not yet orientated to functionally make contact with ground. Landing gear 200 in this configuration may have kingpin 208 in a non-vertical orientation. For instance, kingpin 208 may be oriented substantially parallel to (and/or in-plane with) lower A arm 212.

Referring specifically to FIGS. 4A-B, landing gear 200 is illustrated in a lowered and unfolded configuration fully extended. Upper A arm 216 may be substantially parallel with lower A arm 212 when landing gear is unfolded. As described above, positioning of upper A arm 216 (e.g., distal segment 224a and middle segment 224b) may be achieved by way of an upper A arm actuator 228. In some cases, actuator 228 may force middle segment 224b against a mechanical stop preventing the middle segment from being rotated at upper A arm hinge 220b beyond a plane of proximal segment 224c of upper A arm 216. In some cases, when landing gear 200 is unfolded, kingpin 208 may be oriented substantially vertically, for instance at an angle relative lower A arm 212 plane. In certain aspects of the disclosure, landing gear height may be adjusted, for example by displacing at least a piston 244a-b.

Specifically referring to FIGS. 5A-B, landing gear 200 is illustrated in a lower and unfolded configuration fully compressed (i.e., with wheel 204 located as close as possible to aircraft while still being configured to contact ground). Comparison between FIGS. 4A-B and FIGS. 5A-B indicates a different displacement of piston 244a-b. FIGS. 4A-B shows piston 244a-b in an extreme extended position. FIGS. 5A-B in an extreme retracted position. As a result, landing gear, as shown in FIGS. 5A-B may yield a much shorter landing gear height (i.e., distance between aircraft and ground) at the landing gear 200, for example when compared to the landing gear configuration shown in FIGS. 4A-B.

Figure 6:
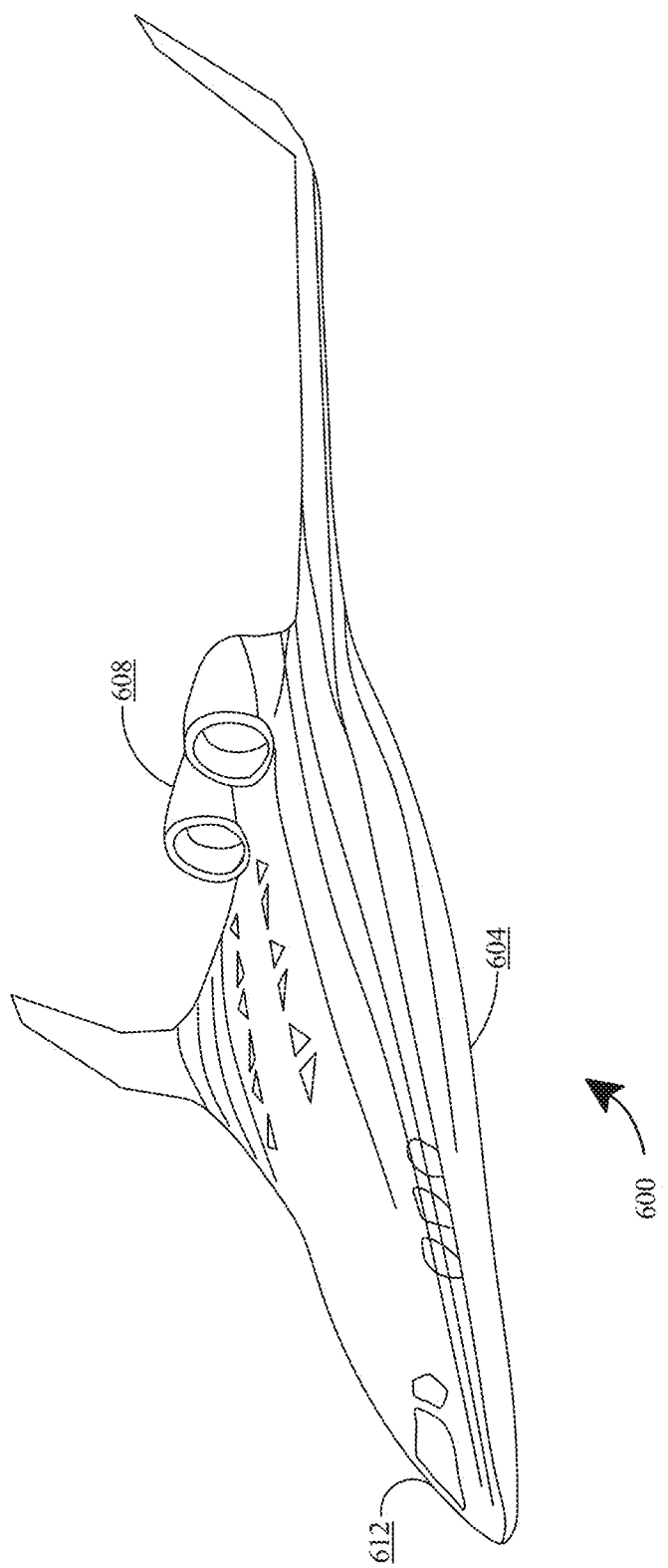
FIG. 6 is a schematic of an exemplary blended wing aircraft.

Referring to FIG. 6, an exemplary blended wing aircraft 600 is illustrated. Aircraft 600 may include a blended wing body 604. As described above, a blended wing body aircraft may be an aircraft having a blended wing body. As used in this disclosure, A blended wing body (BWB), also known as a blended body or a hybrid wing body (HWB), is a fixed-wing aircraft body having no clear demarcation between wings and a main body of the aircraft at the leading edge of the wings. For example, a BWB 604 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 604 design may or may not be tailless. One potential advantage of a BWB 604 may be to reduce wetted area and any accompanying drag associated with a conventional wing-body junction. In some cases, a BWB 604 may also have a wide airfoil-shaped body, allowing entire aircraft to generate lift and thereby facilitate reduction in size and/or drag of wings. In some cases, a BWB 604 may be understood as a hybrid shape that resembles a flying wing, but also incorporates features from conventional aircraft. In some cases, this combination may offer several advantages over conventional tube-and-wing airframes. In some cases, a BWB airframe 604 may help to increase fuel economy and create larger payload (cargo or passenger) volumes within the BWB. BWB 604 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 6, BWB 604 of aircraft 600 may include a nose portion. A "nose portion," for the purposes of this disclosure, refers to any portion of aircraft 600 forward of the aircraft's fuselage 616. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 6, BWB 604 may include at least a structural component of aircraft 600. Structural components may provide physical stability during an entirety of an aircraft's 600 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 600 structure, they may be so named A, B, C, and so on named from nose to tail. Pillars, like any structural element, may be disposed a distance away from each other, along an exterior of aircraft 600 and BWB 604. Depending on manufacturing method of BWB 604, pillars may be integral to frame and skin, comprised entirely of internal framing, or alternatively, may be only integral to structural skin elements. Structural skin will be discussed in greater detail below.

With continued reference to FIG. 6, BWB 604 may include a plurality of materials, alone or in combination, in its construction. At least a BWB 604, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 604 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 604 may additionally or alternatively use wood or another suitably strong yet light material for an internal structure.

With continued reference to FIG. 6, aircraft 600 may include monocoque or semi-monocoque construction. BWB 604 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 6, BWB 604 may include at least a fuselage. A "fuselage," for the purposes of this disclosure, refers to a main body of an aircraft 600, or in other words, an entirety of the aircraft 600 except for nose, wings, empennage, nacelles, and control surfaces. In some cases, fuselage may contain an aircraft's payload. At least a fuselage may comprise structural components that physically support a shape and structure of an aircraft 600. Structural components may take a plurality of forms, alone or in combination with other types. Structural components vary depending on construction type of aircraft 600 and specifically, fuselage. A fuselage 612 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 6, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 600. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 600 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 6, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 6, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 6, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in 2) or Pascals (Pa). In semi-monocoque construction stressed skin bears part of aerodynamic loads and additionally imparts force on an underlying structure of stringers and formers.

With continued reference to FIG. 6, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 600 is in its level flight orientation or sitting on ground. A post may act similarly to stringer in that it is configured to support axial loads in compression due to a load being applied parallel to its axis due to, for example, a heavy object being placed on a floor of aircraft 600. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 6, aircraft 600 may include at least a flight component 608. A flight component 608 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 600 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 600. In some embodiments, at least a flight component 608 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 6, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 6, at least a flight component may be one or more devices configured to affect aircraft's 600 attitude. "Attitude", for the purposes of this disclosure, is the relative orientation of a body, in this case aircraft 600, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 600. A plurality of attitude datums may indicate one or more measurements relative to an aircraft's pitch, roll, yaw, or throttle compared to a relative starting point. One or more sensors may measure or detect an aircraft's 600 attitude and establish one or more attitude datums. An "attitude datum", for the purposes of this disclosure, refers to at least an element of data identifying an attitude of an aircraft 600.

With continued reference to FIG. 6, in some cases, aircraft 600 may include at least a pilot control. As used in this disclosure, a "pilot control," is an interface device that allows an operator, human or machine, to control a flight component of an aircraft. Pilot control may be communicatively connected to any other component presented in aircraft 600, the communicative connection may include redundant connections configured to safeguard against single-point failure. In some cases, a plurality of attitude datums may indicate a pilot's instruction to change heading and/or trim of an aircraft 600. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 600. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 608 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 6, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 608. At least a flight component 608 may include any propulsor as described herein. In embodiment, at least a flight component 608 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 6, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 6, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 6, at least a flight component 608 may include wings, empennages, nacelles, control surfaces, fuselages, and landing gear, among others, to name a few. In embodiments, an empennage may be disposed at the aftmost point of an aircraft body 604. Empennage may comprise a tail of aircraft 600, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 600 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 600 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 604 aircraft 600 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 608 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 608 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 600. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 600 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 6, aircraft 600 may include an energy source. Energy source may include any device providing energy to at least a flight component 608, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 6, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 604 of aircraft 600, for example without limitation within a wing portion 612 of blended wing body 608. Aviation fuels may include petroleum-based fuels, or petroleum and synthetic fuel blends, used to power aircraft 600. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 600. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 6, modular aircraft 600 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 6, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 6 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 6, aircraft 600 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 6, aircraft 600 may include multiple flight component 608 sub-systems, each of which may have a separate energy source. For instance, and without limitation, one or more flight components 608 may have a dedicated energy source. Alternatively, or additionally, a plurality of energy sources may each provide power to two or more flight components 608, such as, without limitation, a "fore" energy source providing power to flight components located toward a front of an aircraft 600, while an "aft" energy source provides power to flight components located toward a rear of the aircraft 600. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 608. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 6, aircraft 600 may include a flight component 608 that includes at least a nacelle 608. For the purposes of this disclosure, a "nacelle" is a streamlined body housing, which is sized according to that which is houses, such as without limitation an engine, a fuel store, or a flight component. When attached by a pylon entirely outside an airframe 604 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 600 partially or wholly enveloped by an outer mold line of the aircraft 600. At least a nacelle may be designed to be streamlined. At least a nacelle may be asymmetrical about a plane comprising the longitudinal axis of the engine and the yaw axis of modular aircraft 600.

With continued reference to FIG. 6, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 6, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 6, in nonlimiting embodiments, at least a flight component 608 may include an airbreathing engine such as a jet engine, turbojet engine, turboshaft engine, ramjet engine, scramjet engine, hybrid propulsion system, turbofan engine, or the like. At least a flight component 608 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 6, an aircraft 600 may include a flight controller. As used in this disclosure, a "flight controller" is a device that generates signals for controlling at least a flight component 608 of an aircraft 600. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 6, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 600 and/or computing device.

With continued reference to FIG. 6, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
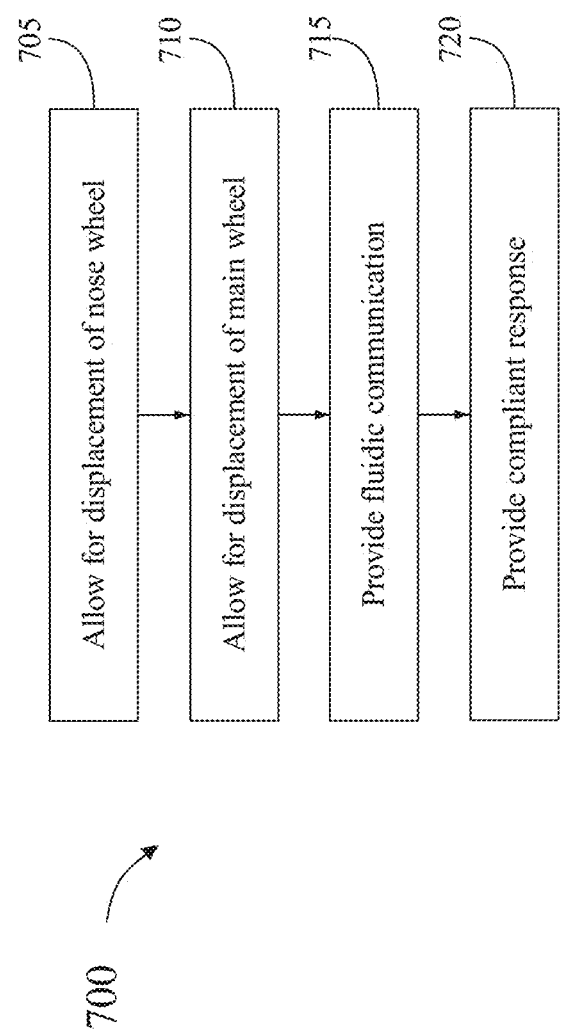
FIG. 7 is a flow diagram illustrating an exemplary method of controlling landing gear of an aircraft.

Referring now to FIG. 7, a method 700 of controlling landing gear of an aircraft is illustrated by way of a flow diagram. At step 705, method 700 may include allowing for displacement, using a nose piston of a nose gear located at a nose of aircraft, a nose wheel relative the aircraft. Nose gear may be located at nose of aircraft. Nose wheel may include any wheel described in this disclosure, for example with reference to FIGS. 1-6. Nose gear may include any landing gear described in this disclosure, for example with reference to FIGS. 1-6. Nose piston may include any piston located at a nose of aircraft. In some cases, nose piston may include a first end of the nose piston attached, directly or indirectly, to nose wheel and a second end of the nose piston attached, directly or indirectly, to aircraft.

With continued reference to FIG. 7, at step 710, method 700 may include allowing for displacement, using a main piston of a main gear located aft of nose gear, a main wheel relative aircraft. Main wheel may include any wheel described in this disclosure, for example with reference to FIGS. 1-6. Main gear may include any landing gear described in this disclosure, for example with reference to FIGS. 1-6. Main piston may include any piston described in this disclosure, for example with reference to FIGS. 1-6. In some cases, main piston may include a first end of the main piston attached, directly or indirectly, to main wheel and a second end of the main piston attached, directly or indirectly, to the aircraft.

With continued reference to FIG. 7, at step 715, method 700 may include providing, using a hydraulic circuit, fluidic communication with each of nose piston and main piston. Hydraulic circuit may include any hydraulic circuit described in this disclosure, for example with reference to FIGS. 1-6.

With continued reference to FIG. 7, at step 720, method 700 may include providing, using a compliant element in fluidic communication with hydraulic circuit, a compliant response at one or both of the nose piston and the main piston. Compliant element may include any compliant element described in this disclosure, for example with reference to FIGS. 1-6. Hydraulic circuit may include any hydraulic circuit described in this disclosure, for example with reference to FIGS. 1-6. In some embodiments, compliant element may include a nose compliant element in fluidic communication with nose piston; and step 725 may additionally include providing, using the nose compliant element, a compliant response at nose gear. Nose compliant element may include any compliant element described in this disclosure, for example with reference to FIGS. 1-6. In some embodiments, compliant element may include a main compliant element in fluidic communication with main piston; and step 725 may additionally include providing, using the main compliant element, a compliant response at main gear. Main compliant element may include any compliant element described in this disclosure, for example with reference to FIGS. 1-6. In some embodiments, compliant element may include an accumulator.

Still referring to FIG. 7, in some embodiments, method 700 may additionally include displacing, using a displacement element of hydraulic circuit, one or both of nose piston and main piston. Displacement element may include any displacement element described in this disclosure, for example with reference to FIGS. 1-6. In some embodiments, step 730 may additionally include varying, using a linking valve of displacement element, a degree of fluidic communication between nose piston and main piston. Linking valve may include any linking valve described in this disclosure, for example with reference to FIGS. 1-6. In some embodiments, displacement element may include a hydraulic pump.

Still referring to FIG. 7, in some embodiments, method 700 may include controlling, using a controller, a parameter associated with displacement element. Controller may include any controller or computing device described in this disclosure, for example with reference to FIGS. 1-6 and 8. In some embodiments, step 735 may additionally include controlling, using controller, parameter associated with displacement element to vary an angle of attack of aircraft. Angle of attack may include any angle of attack described in this disclosure, for example with reference to FIGS. 1-6. In some embodiments, method 700 may additionally include controlling, using controller, a parameter associated with compliant element. In some embodiments, aircraft may include a blended wing body. Blended wing body may include any blended wing body described in this disclosure, including with reference to FIGS. 1-6.

Still referring to FIG. 7, in some embodiments method 700 may additionally include folding and unfolding, using a nose gear actuator of nose gear, the nose gear, folding and unfolding, using a main gear actuator of main gear, the main gear, and controlling, using controller, one or both of the nose gear actuator and the main gear actuator. Nose gear actuator may include any actuator described in this disclosure, including with reference to FIGS. 1-6. Main gear actuator may include any actuator described in this disclosure, including with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
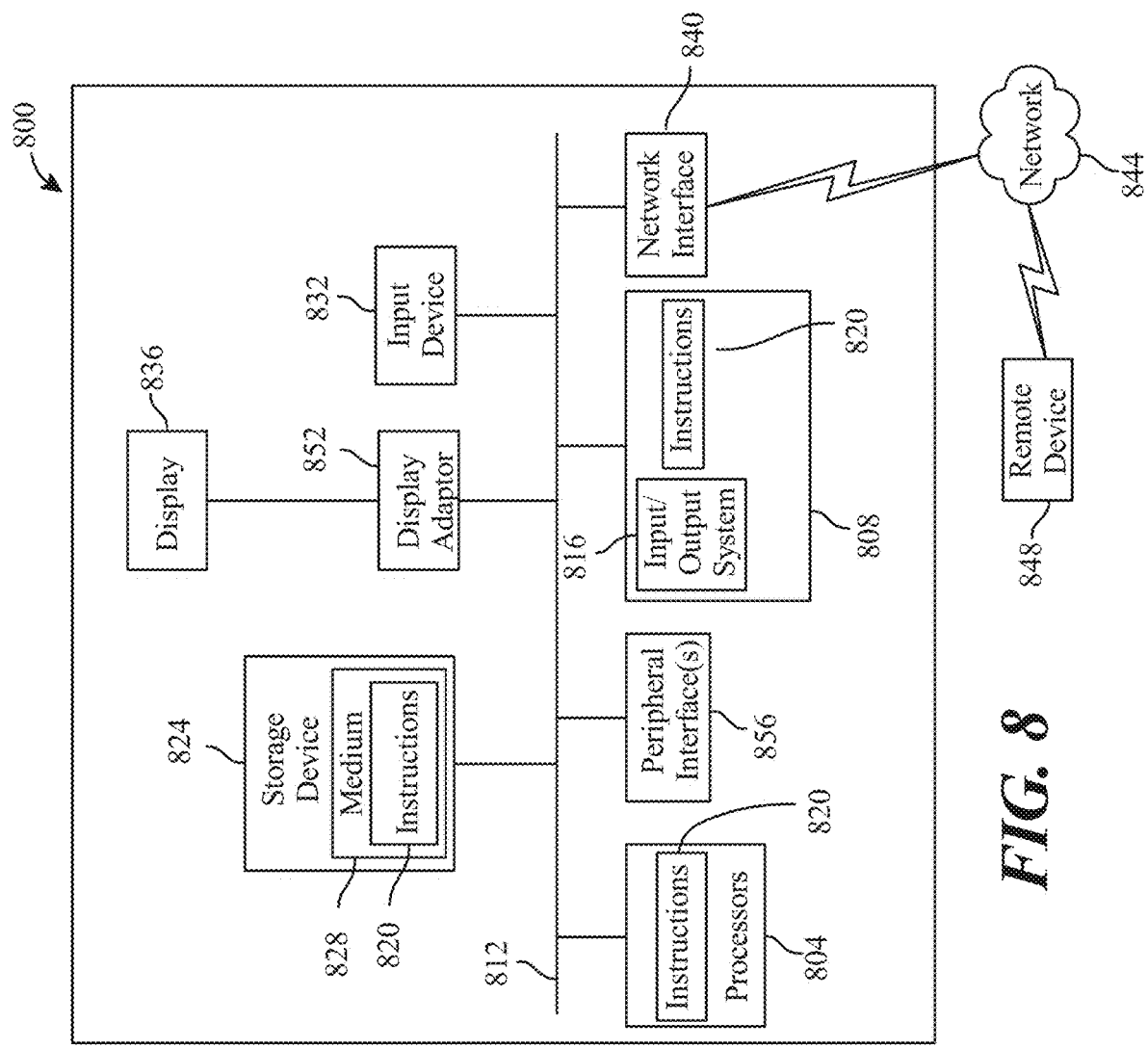
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for controlling landing gear on an aircraft, the system comprising:
   at least a nose gear located at a nose of the aircraft, wherein the at least a nose gear comprises a nose piston configured to allow for displacement of a nose wheel relative to the aircraft;
   at least a main gear located aft of the at least a nose gear, wherein the at least a main gear comprises a main piston configured to allow for displacement of a main wheel relative to the aircraft;
   a hydraulic circuit in fluidic communication with each of the nose piston and the main piston;
   a compliant element in fluidic communication with the hydraulic circuit and configured to provide a compliant response at both of the nose piston and the main piston;
   a nose gear actuator configured to extend and retract the at least a nose gear;
   a main gear actuator configured to extend and retract the at least a main gear;
   a controller, wherein the controller is configured to control a compliant parameter associated with the compliant response of the compliant element and wherein the controller is further configured to calculate an appropriate combination of the compliant parameter and a resistant parameter as a function of a look up table; and
   at least a gear sensor communicative with the controller and configured to detect folding and unfolding of the at least a nose gear and the at least a main gear.

2. The system of claim 1, wherein a displacement element comprises a hydrodynamic pump.

3. The system of claim 2, further comprising a reservoir in fluidic communication with the hydrodynamic pump, wherein the reservoir is configured to store hydraulic fluid, and
   wherein the hydrodynamic pump is configured to generate a vacuum at an inlet of the hydrodynamic pump to force hydraulic fluid from the reservoir into the pump inlet.

4. The system of claim 3, wherein the reservoir is unpressurized such that the reservoir allows for displacement without affecting the compliant response.

5. The system of claim 1, wherein the at least a nose gear comprises a nose linkage, wherein the nose linkage is configured to transform movement of the nose piston to movement of the nose wheel relative to the aircraft.

6. The system of claim 1, wherein the nose piston comprises:
   a first end, wherein the first end is attached to the nose wheel; and a second end, wherein the second end is attached to the aircraft.

7. The system of claim 1, wherein the nose piston comprises a hydraulic cylinder.

8. The system of claim 1, wherein the hydraulic circuit further comprises a linking valve configured to vary a degree of fluidic communication between the nose piston and the main piston.

9. The system of claim 1, wherein:
the nose gear actuator is configured to fold and unfold the at least a nose gear; and
the main gear actuator is configured to fold and unfold the at least a main gear.

10. A method of controlling landing gear on an aircraft, the method comprising:
displacing, by a nose piston of at least a nose gear located at a nose of an aircraft, a nose wheel relative to the aircraft;
displacing, by a main piston of at least a main gear located aft of the at least a nose gear, a main wheel relative to the aircraft;
providing, by a compliant element in fluidic communication with a hydraulic circuit in fluidic communication with each of the nose piston and the main piston, a compliant response at both of the nose piston and the main piston;
extending and retracting, by a nose gear actuator, the at least a nose gear;
extending and retracting, by a main gear actuator, the at least a main gear;
controlling, by a controller, a compliant parameter associated with the compliant response of the compliant element and calculating an appropriate combination of the compliant parameter and a resistant parameter as a function of a look up table; and detecting, by at least a gear sensor communicative with the controller, folding and unfolding of the at least a nose gear and the at least a main gear.

11. The method of claim 10, wherein a displacement element comprises a hydrodynamic pump.

12. The method of claim 11, further comprising:
storing, by a reservoir in fluidic communication with the hydrodynamic pump, a hydraulic fluid; and
generating, by the hydrodynamic pump, a vacuum at an inlet of the hydrodynamic pump to force hydraulic fluid from the reservoir into the pump inlet.

13. The method of claim 12, wherein the reservoir is unpressurized such that the reservoir allows for displacement without affecting the compliant response.

14. The method of claim 10, transforming movement, by a nose linkage of the at least a nose gear, of the nose piston to movement of the nose wheel relative to the aircraft.

15. The method of claim 10, wherein the nose piston comprises:
a first end, wherein the first end is attached to the nose wheel; and
a second end, wherein the second end is attached to the aircraft.

16. The method of claim 10, wherein the nose piston comprises a hydraulic cylinder.

17. The method of claim 10, wherein the hydraulic circuit further comprises a linking valve configured to vary a degree of fluidic communication between the nose piston and the main piston.

18. The method of claim 10, further comprising:
folding and unfolding, by the nose gear actuator, the at least a nose gear; and
folding and unfolding, by the main gear actuator, the at least a main gear.

* * * * *